Feb. 7, 1933.    A. LANZETTA    1,896,822
TANDEM WING AEROPLANE
Filed June 9, 1931

Inventor:
Anthony Lanzetta
By: Peter W. Boesen
Attorney

Patented Feb. 7, 1933

1,896,822

UNITED STATES PATENT OFFICE

ANTHONY LANZETTA, OF NEW YORK, N. Y.

TANDEM WING AEROPLANE

Application filed June 9, 1931. Serial No. 543,089.

This invention relates to improvements in tandem wing aeroplanes and has particular reference to the different angles of incidence of their wings.

An object of the invention is to provide an improved construction wherein the disposition is such as to secure a maximum lifting power from any given area of wing surface.

Another object is to have wings spaced in close proximity to each other all having the rear edge partly or entirely arranged in the same horizontal line, with the front edge of each wing arranged obliquely at a higher angle of incidence than the former wing.

The above and other objects will appear more clearly from the following detailed description, when taken in connection with the accompanying drawing, which illustrates preferred embodiments of the inventive idea.

In the drawing—

Figure 1:
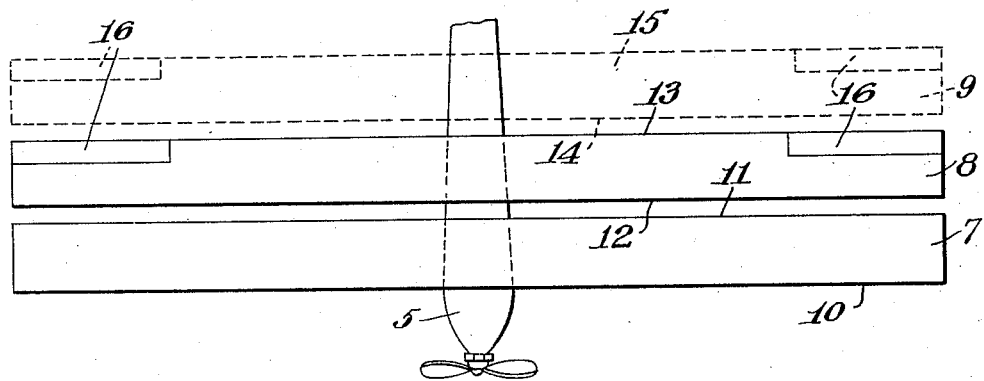
Figure 1 is a fragmentary plan view of an aeroplane showing one form of the invention.

All of the figures of the drawing illustrate more or less conventionally the fuselage 5 and landing gear 6 of an aeroplane.

Figure 2:
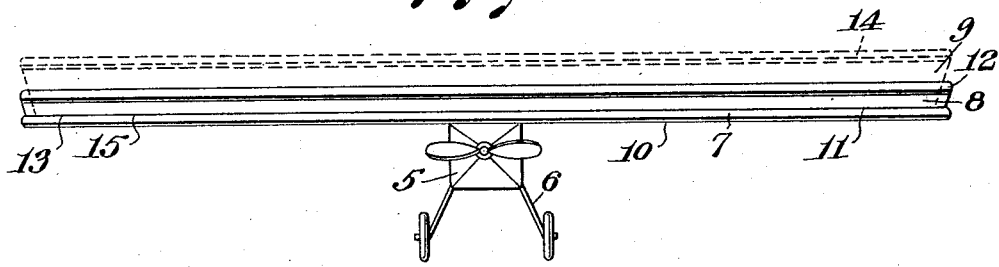
Figure 2 is a front elevation thereof.
Figure 3:
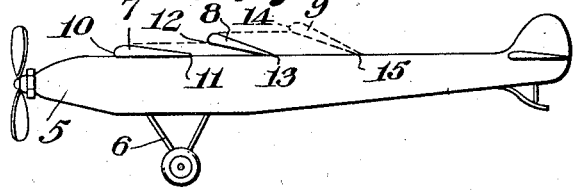
Figure 3 is a fragmentary side elevation.

In the embodiment of the invention shown in Figures 1 to 3 the fuselage 5 supports the first wing 7, the second wing 8 and the additional wing 9 in dotted lines; the ailerons conventionally shown at 16 are only at the rear edge extremities of the second or of any additional wing. The wings 7, 8 and 9 extend transversely of the fuselage 5 on opposite sides thereof. The first wing 7 has its entire area in the same horizontal plane with the front edge 10 horizontally parallel to its rear edge 11 and also to the rear edges 13 and 15 of the second wing 8 and the additional wing 9. The front edge 12 of the second wing 8 is horizontally higher above the front edge 10 of wing 7, and thereon for any additional wing as the front edge 14 of the dotted wing 9 is higher above the front edges 10 and 12 of wings 7 and 8.

Figure 4:
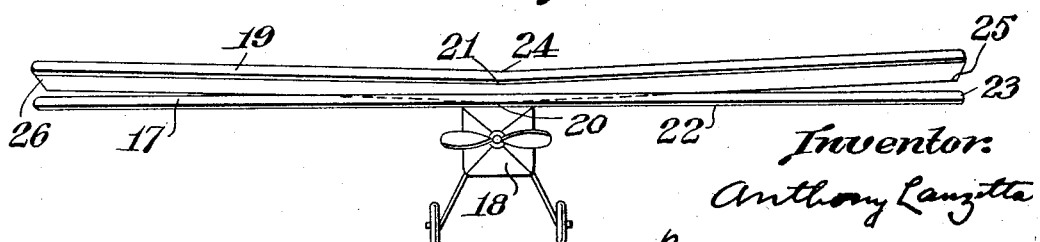
Figure 4 is a front elevation of another form.

Figure 4 illustrates the same general principle of arranged portions. The entire area of the first wing 17 is in the same horizontal plane extending transversely of the fuselage 18 on opposite sides thereof. The second wing 19 has its central portion 24 and its rear edge 20 arranged in the same horizontal line as the front and rear edges 22 and 23 of wing 17 and the front edge 21 of wing 19 raised above the horizontal line of the front edge 22 of wing 17; but the end portions of said second wing 19 on opposite sides of the portion 24 are inclined upward so that each end portion 25 and 26 will be disposed diagonally relative to the wing 17 and in a plane above the same.

What is claimed is:

1. In an aeroplane a plurality of wings arranged in close proximity one behind the other in such a manner that in the middle vertical longitudinal plane the rear edges of all the wings are in approximately the same horizontal line with the front edge of the first wing, whereas the front edges of all the wings following the first wing are in consecutive order higher than the front edge of each preceding wing, so as to give to the different wings in consecutive order a higher angle of incidence.

2. In an aeroplane a plurality of wings as claimed in claim 1, in combination with ailerons on the outer rear edges of the last wing.

3. In an aeroplane a plurality of wings as claimed in claim 1, in which the lateral ends of each wing, except the first wing, are situated slightly higher than the corresponding parts of the same wing, which are situated in the longitudinal vertical axial plane of the aeroplane.

4. In an aeroplane a plurality of wings, as claimed in claim 1, in combination with a fuselage of any suitable type, arranged transversely at and fastened to the wings.

5. In an aeroplane a plurality of wings, as claimed 1, in combination with a boat of any suitable type, arranged transversely at and fastened to the said wings.

6. In an aeroplane a plurality of wings, as claimed in claim 1, in combination with a float of any suitable type, arranged transversely at and fastened to the said wings.

7. In an aeroplane a plurality of wings, as claimed in claim 1, in combination with a fuselage of any suitable type, arranged transversely at and fastened below the said wings.

8. In an aeroplane a plurality of wings, as claimed in claim 1, in combination with a fuselage of any suitable type arranged transversely at and fastened to the central zones of the wings.

9. In an aeroplane a plurality of wings, as claimed in claim 1, in combination with a fuselage of any suitable type, arranged transversely at and fastened to the wings, and ailerons near the outer ends of any wings following the first wing.

Signed at New York city, in the county of Bronx and State of New York this 8th day of June A. D. 1931.

ANTHONY LANZETTA.